(12) United States Patent
Hjelmeland

(10) Patent No.: US 7,441,257 B2
(45) Date of Patent: Oct. 21, 2008

(54) METHOD AND APPARATUS FOR COOLING A COMPACT DISC

(75) Inventor: Robert W. Hjelmeland, Kempton, IN (US)

(73) Assignee: Delphi Technologies, Inc., Troy, MI (US)

( * ) Notice: Subject to any disclaimer, the term of this patent is extended or adjusted under 35 U.S.C. 154(b) by 589 days.

(21) Appl. No.: 10/797,417

(22) Filed: Mar. 10, 2004

(65) Prior Publication Data

US 2005/0204376 A1 Sep. 15, 2005

(51) Int. Cl.
*G11B 33/14* (2006.01)
(52) U.S. Cl. ..................................................... 720/649
(58) Field of Classification Search ......... 720/648–649, 720/652, 696–697, 699, 706–707, 712, 703, 720/710, 715; 360/97.01–97.04; 361/687–688, 361/696
See application file for complete search history.

(56) References Cited

U.S. PATENT DOCUMENTS

| | | | | |
|---|---|---|---|---|
| 4,823,337 A | * | 4/1989 | Van Zanten et al. | 720/710 |
| 5,793,740 A | * | 8/1998 | Nguyen | 369/264 |
| 5,799,006 A | * | 8/1998 | Mukawa | 720/707 |
| 6,699,013 B2 | * | 3/2004 | Zweighaft et al. | 416/1 |
| 2001/0015951 A1 | * | 8/2001 | Yabushita | 369/270 |
| 2005/0216926 A1 | * | 9/2005 | Chang | 720/649 |

FOREIGN PATENT DOCUMENTS

| | | | | |
|---|---|---|---|---|
| JP | 01171144 A | * | 7/1989 |
| JP | 03127395 A | * | 5/1991 |
| JP | 04061686 A | * | 2/1992 |
| JP | 08279242 A | * | 10/1996 |
| JP | 10275458 A | * | 10/1998 |
| JP | 2001023365 A | * | 1/2001 |

OTHER PUBLICATIONS

Machine translation and English abstract of JP 08279242 A.*
Official English translation of JP 01-171144.*
Machine translation of JP 2001023365 A.*

* cited by examiner

*Primary Examiner*—Joseph Feild
*Assistant Examiner*—Nathan Danielsen
(74) *Attorney, Agent, or Firm*—Jimmy L. Funke

(57) ABSTRACT

An apparatus for cooling a compact disc includes an actuator for rotating the compact disc. An air-moving device is driven by the actuator and moves air about the compact disc.

12 Claims, 5 Drawing Sheets

METHOD AND APPARATUS FOR COOLING A COMPACT DISC

TECHNICAL BACKGROUND

This invention relates generally to compact discs, and, more particularly, to a machine for reading or writing to a compact disc.

BACKGROUND OF THE INVENTION

While the present invention is described, for illustrative purposes, as being applied to a compact disc player that reads a compact disc, it will be understood that it can be employed in any machine that processes a compact disc, such as a machine that writes to a compact disc.

A compact disc player tends to heat up, i.e., raise the temperature of, a compact disc that it plays, mostly due to the heat produced by the high power electronics in the compact disc player. Heating of a compact disc is considered undesirable because a hot disc is unpleasant to the touch, and because a consumer may fear that the compact disc will become warped or otherwise damaged from the heat. Thus, what is needed in the art is a device for cooling a compact disc before the disc is ejected from the player.

Adding a motor and a fan to the compact disc player is not a desirable solution to the problem of cooling a compact disc. First, the only location in the player in which it may be practical to add a motor and a fan is at the rear or side of the player's housing. These locations are not ideal for the cooling of the surface of the compact disc. Second, motors and cooling fans that are typically used in compact disc players and radios are comparatively expensive. Third, the additional power draw of the fan motor may require a more expensive or larger power supply. Finally, motors and fans mounted on the chassis of a radio or compact disc player can become acoustically noisy, i.e., create an unpleasant audible sound, as well as electrically noisy, i.e., create undesirable magnetic fields resulting in electromagnetic interference (EMI).

What is needed in the art is a method and apparatus for cooling a compact disc in a compact disc player that is inexpensive, does not draw substantial amounts of additional power, and that does not cause acoustic or electrical noise.

SUMMARY OF THE INVENTION

The present invention provides a fan in the form of a plurality of propellers that are attached to the hub of the compact disc player. During reading of the compact disc, the propellers rotate along with the hub, thereby cooling the compact disc by either blowing air toward or drawing air away from the compact disc.

According to one embodiment of the invention, an apparatus for cooling a compact disc includes an actuator for rotating the compact disc. An air-moving device is driven by the actuator and moves air about the compact disc.

According to another embodiment of the present invention, an apparatus for cooling a compact disc includes a hub retaining the compact disc. At least one propeller is attached to the hub. An actuator is coupled to the hub and rotates the hub such that the at least one propeller moves air about the compact disc.

According to yet another embodiment of the present invention, a method for processing a compact disc includes placing the compact disc on a rotatable hub such that a throughhole of the compact disc receives the hub. The compact disc is engaged with a fan device such that the compact disc is biased farther onto the hub. The fan device is attached to the hub. The hub is rotated such that the compact disc and the fan device also rotate, and the fan device moves air about the compact disc to thereby carry heat away from the compact disc.

An advantage of the present invention is that an additional motor is not required in order to operate the fan.

Another advantage is that the fan does not draw additional power, and no modification of the power supply is needed.

Yet another advantage is that the fan does not create additional acoustic or electrical noise.

BRIEF DESCRIPTION OF THE DRAWINGS

The present invention will now be described, by way of example, with reference to the accompanying drawings, in which.

Figure 1:
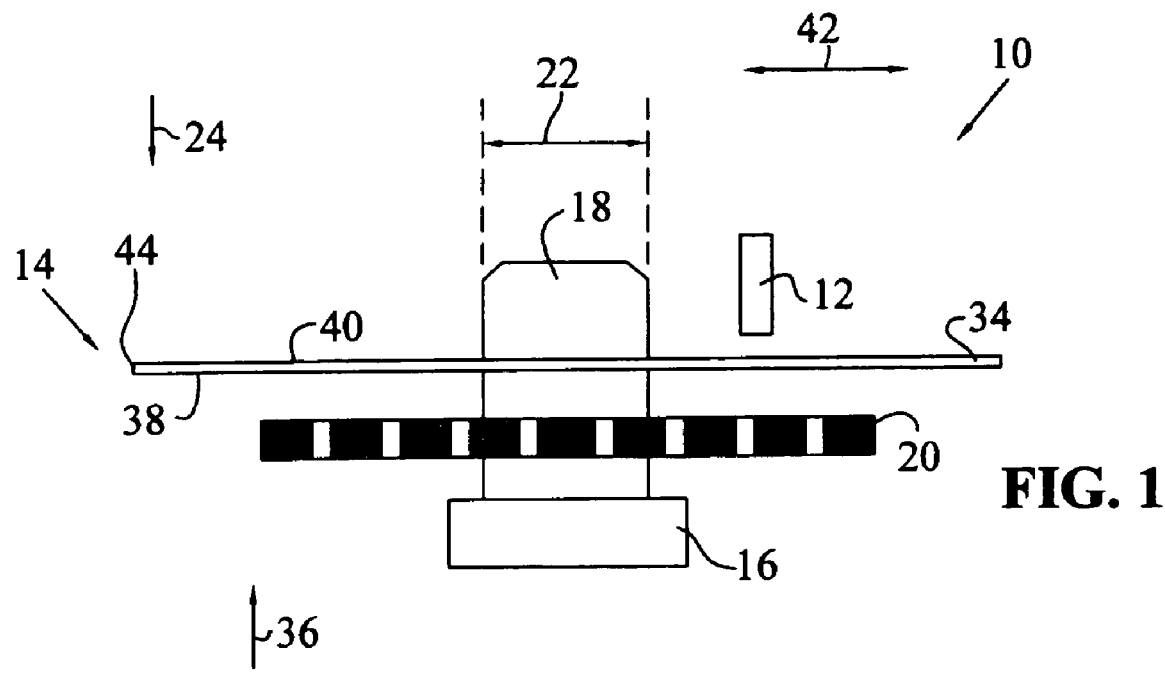
FIG. 1 is a schematic side view of a compact disc player including one embodiment of a compact disc cooling apparatus of the present invention.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplifications set out herein illustrate an embodiment of the invention and such exemplifications are not to be construed as limiting the scope of the invention in any manner.

DESCRIPTION OF INVENTION

Referring now to the drawings, and particularly to FIG. 1, there is shown an embodiment of a compact disc player 10 including a read head 12 and a compact disc cooling apparatus 14 of the present invention. Cooling apparatus 14 includes an actuator in the form of a motor 16 coupled to a hub 18. An air-moving device in the form of a fan 20 is also coupled to or otherwise attached to hub 18.

Figure 2:
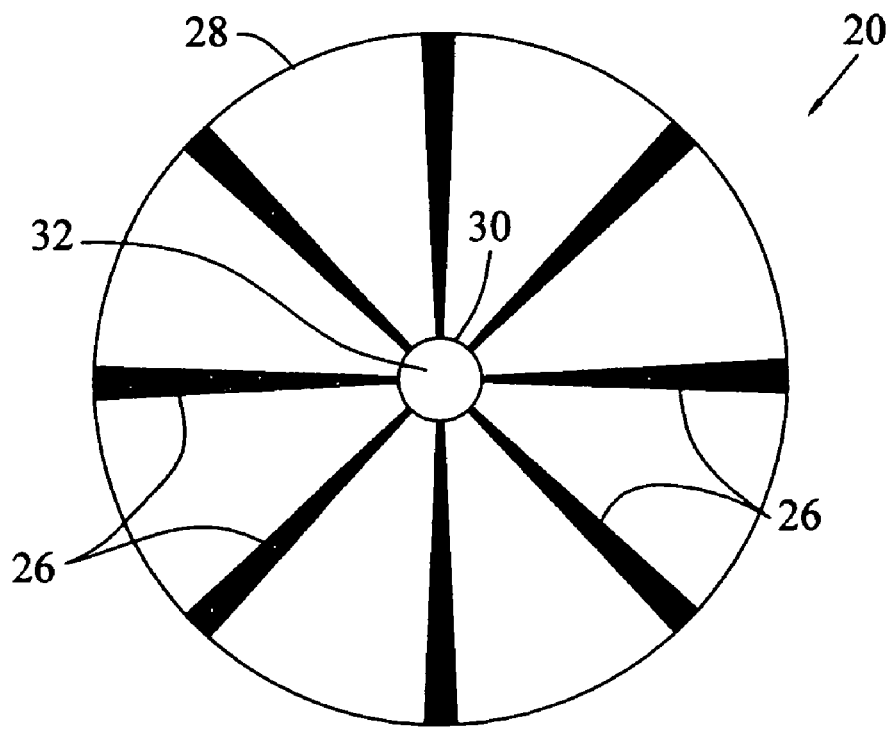
FIG. 2 is a top view of one embodiment of the air-moving device of the cooling apparatus of FIG. 1.

Hub 18 can be substantially cylindrically shaped with a slight taper such that the width or diameter 22 of hub 18 increases slightly in direction 24. Fan 20 can be a closed ring type of fan including propellers 26 (FIG. 2) interconnecting an outer closed ring 28 and an inner closed ring 30 that defines a circular throughhole 32. Conversely, rings 28, 30 connect propellers 26 together.

When cooling apparatus 14 is assembled, fan 20 is placed on hub 18 such that throughhole 32 receives hub 18 with a friction fit. More particularly, fan 20 is placed on hub 18 such that ring 30 slides along hub 18 in direction 24 until the increasing diameter of hub 18 matches the diameter of throughhole 32. Due to the friction between ring 30 and hub 18, fan 20 is thus snugly attached to hub 18 with propellers 26 extending in a radial direction from hub 18. When a consumer inserts a compact disc 34 into player 10, player 10 places compact disc 34 on hub 18 in a manner similar to how fan 20 is placed on hub 18. Compact disc 34 also includes a central throughhole (not shown) for receiving hub 18 as is well known in the art.

In operation, motor 16 rotates hub 18 at a speed approximately between 230 and 27,900 revolutions per minute. It is possible for motor 16 to rotate hub 18 in either direction, i.e., clockwise or counterclockwise. Both fan 20 and compact disc 34 rotate along with hub 18 by virtue of being attached thereto by a friction fit. The rotation of fan 20 can causes propellers 26 to blow air in direction 36 toward a label-side 38 of compact disc 34, i.e., toward a side of compact disk 34 opposite read head 12. Alternatively, fan 20 can be configured such that propellers 26 draw air in direction 24 away from label-side 38. Regardless of whether fan 20 moves air in direction 36 or in direction 24, the moving air removes heat from label-side 38 of compact disc 34 via convection.

As compact disc 34 rotates, read head 12 reads information from a read side 40 of compact disc 34 in a manner well known in the art. An arm-like mechanism (not shown) can move read head 12 in the directions indicated by double arrow 42 in order that head 12 can read all information dispersed between the central throughhole and outer edge 44 of read side 40.

Figure 3:
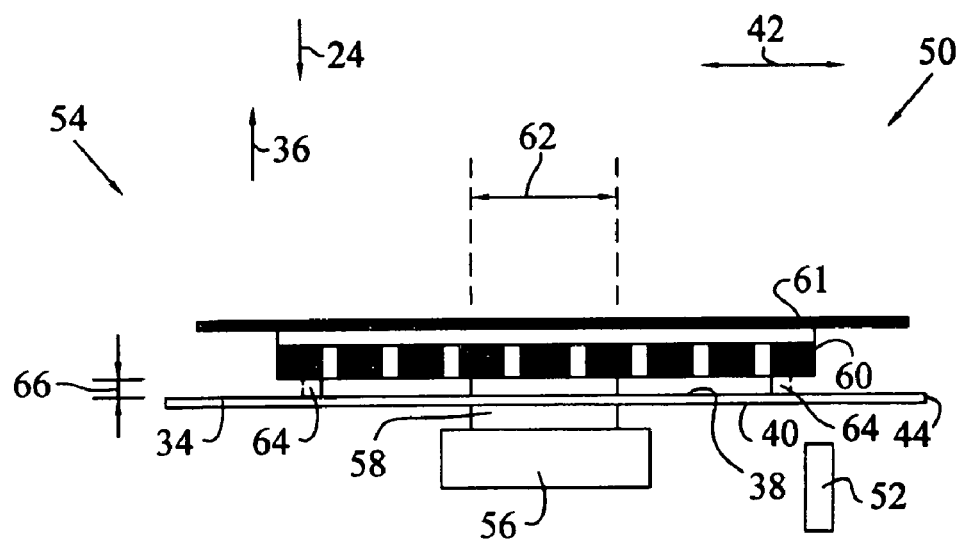
FIG. 3 is a schematic side view of another compact disc player including another embodiment of a compact disc cooling apparatus of the present invention.

Another embodiment of a compact disc player 50 including a read head 52 and a compact disc cooling apparatus 54 of the present invention is shown in FIG. 3. Cooling apparatus 54 includes an actuator in the form of a motor 56 coupled to a hub 58. An air-moving device in the form of a fan 60 is also coupled to or otherwise attached to hub 58. A compression arm 61 is integrally formed with fan 60. That is, compression arm 61 and fan 60 together form a monolithic structure. A compression arm is generally known in the art as a device that pushes a compact disc onto a hub such that a throughhole of the compact disc receives the hub with a friction fit.

Hub 58 can be substantially cylindrically shaped with a slight taper such that the width or diameter 62 of hub 58 increases slightly in direction 24. Fan 60 can be a closed ring type of fan similar to fan 20, including propellers, an outer closed ring and an inner closed ring.

Figure 4:
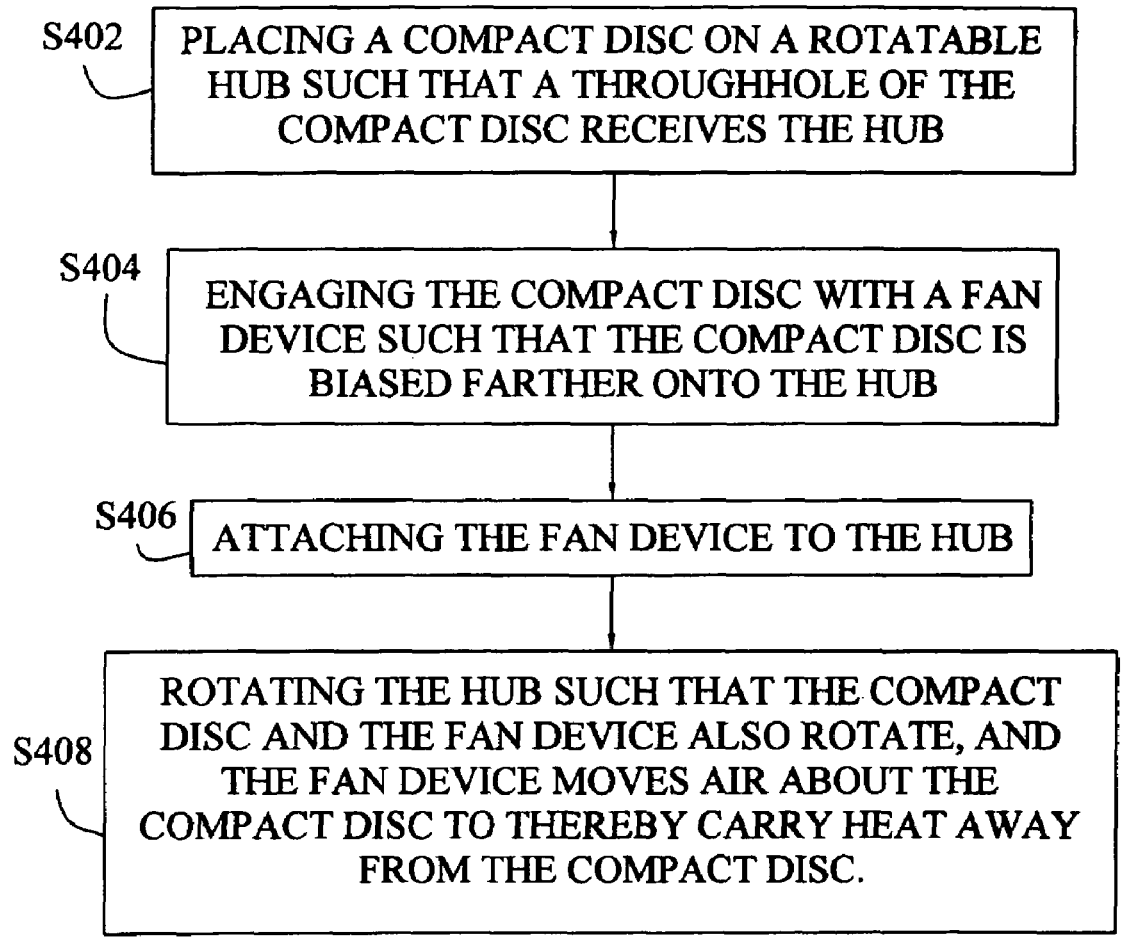
FIG. 4 is a flow chart of one embodiment of a method of the present invention for processing a compact disc.

One embodiment of a method 400 of the present invention for processing a compact disc will now be described with reference to FIGS. 3 and 4. In operation, a consumer inserts a compact disc 34 into player 50, and player 50 places compact disc 34 on hub 58 such that a central throughhole (not shown) of compact disc 34 receives hub 58 (step S402). Player 50 then engages compact disc 34 with fan 60 such that compact disc 34 is biased farther onto hub 58 (step S404) in direction 24. In one embodiment, player 50 uses compression arm 61 to push fan 60 into engagement with compact disc 34 until disc 34 is attached to hub 58 with a friction fit. Fan 60 may include one or more optional projections 64 for engaging and pushing fan in direction 24 while maintaining a gap 66 between the propellers of fan 60 and compact disc 34.

In a next step, fan 60 is attached to hub 58 (step S406). In a particular embodiment, player 50 uses compression arm 61 to push fan 60 onto hub 58 until fan 60 is attached to hub 58 with a friction fit. It is possible for compression arm 61 to pull fan 60 back in direction 36 to thereby create gap 66 after fan 60 has pushed compact disc 34 into its proper place. Gap 66 may be small enough that fan 60 is still attached to hub 58 with a friction fit after being pulled back in direction 36 by compression arm 61 to create gap 66.

Finally, hub 58 is rotated such that compact disc 34 and fan 60 also rotate, and fan 60 moves air about compact disc 34 to thereby carry heat away from compact disc 34 (step S408). In one embodiment, motor 56 rotates hub 58, compact disc 34 and fan 60 such that fan 60 blows air in direction 24 toward label-side 38 of compact disc 34. Alternatively, fan 60 can be configured such that its propellers draw air in direction 36 away from label-side 38. Regardless of whether fan 60 moves air in direction 36 or in direction 24, the moving air removes heat from label-side 38 of compact disc 34 via convection.

As compact disc 34 rotates, read head 52 reads information from a read side 40 of compact disc 34 in a manner well known in the art. An arm-like mechanism (not shown) can move read head 52 in the directions indicated by double arrow 42 in order that head 52 can read all information dispersed between the central throughhole and outer edge 44 of read side 40. Other aspects of compact disc player 50 are substantially similar to those of compact disc player 10, and thus are not discussed in detail herein.

Figure 5:
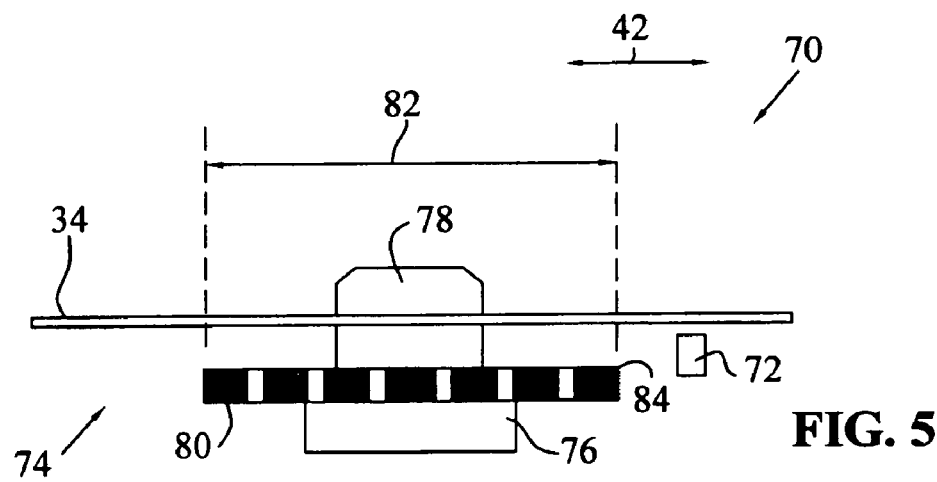
FIG. 5 is a schematic side view of yet another compact disc player including yet another embodiment of a compact disc cooling apparatus of the present invention.

Yet another embodiment of a compact disc player 70 including a read head 72 and a compact disc cooling apparatus 74 of the present invention is shown in FIG. 5. Cooling apparatus 74 includes an actuator in the form of a motor 76 coupled to a hub 78. An air-moving device in the form of a fan 80 is also coupled to or otherwise attached to hub 78.

In contrast to compact disc player 10 of FIG. 1, read head 72 and fan 80 are on the same side of compact disc 34 in player 70. Thus, the propellers of fan 80 move air adjacent a read side 40 of compact disc 34 rather than adjacent a label-side 38 as in players 10, 50. Fan 80 is provided with a diameter 82 that is smaller than the diameter of fan 20 in order to avoid fan 80 interfering with read head 72. More particularly, a radially outermost tip 84 of a propeller of fan 80 is closer to hub 78 in radial direction 42 than is read head 72. Further, as head 72 moves in radial directions 42 to read disc 34, it is possible to prevent read head 72 from moving any closer to hub 78 than is outermost tip 84. This restriction of the movement of head 72 can be achieved either mechanically or via software. Other aspects of compact disc player 70 are substantially similar to those of compact disc player 10, and thus are not discussed in detail herein.

Figure 6:
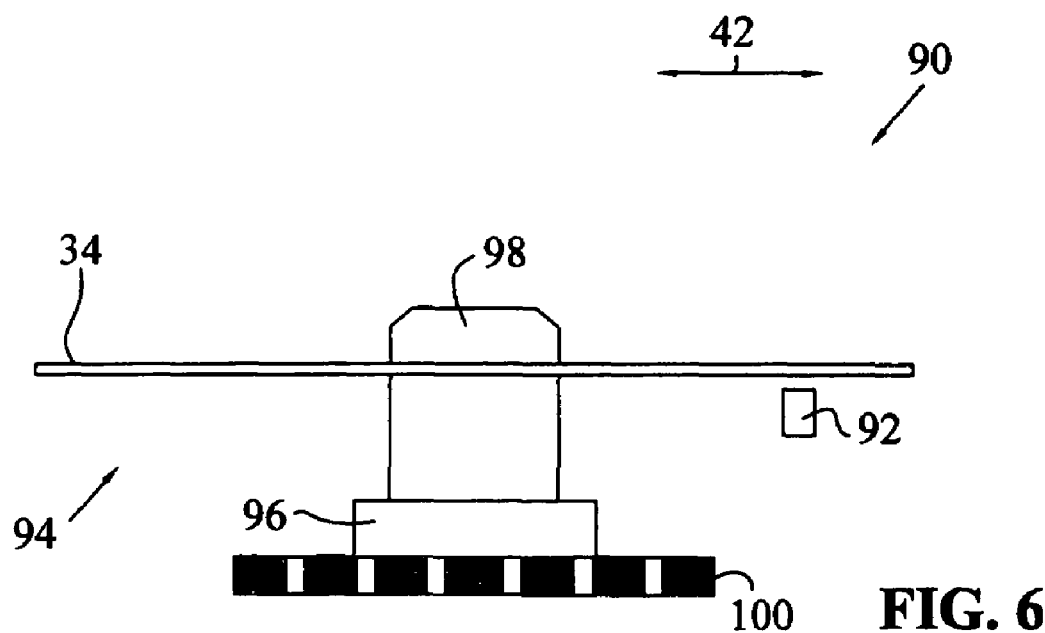
FIG. 6 is a schematic side view of a further compact disc player including a further embodiment of a compact disc cooling apparatus of the present invention.

A further embodiment of a compact disc player 90 including a read head 92 and a compact disc cooling apparatus 94 of the present invention is shown in FIG. 6. Cooling apparatus 94 includes an actuator in the form of a motor 96 coupled to a hub 98.

In contrast to compact disc player 70 of FIG. 5, player 90 includes an air-moving device in the form of a fan 100 that is coupled to or otherwise attached to motor 96 rather than to hub 98. By virtue of being attached to motor 96, fan 100 is not on the same vertical level as read head 92, as can be clearly seen in FIG. 6. Thus, fan 100 does not restrict or limit the movement of read bead 92 in directions 42. However, fan 100 may be provided with a diameter that is smaller than the diameter of fan 20 in order that the area of strongest air movement is limited to the area closely adjacent hub 98. Thus, the reduced diameter of fan 100 can inhibit the air that is moved by fan 100 from disturbing the movement or operation of read head 92. Other aspects of compact disc player 90 are substantially similar to those of compact disc player 10, and thus are not discussed in detail herein.

Figure 7:
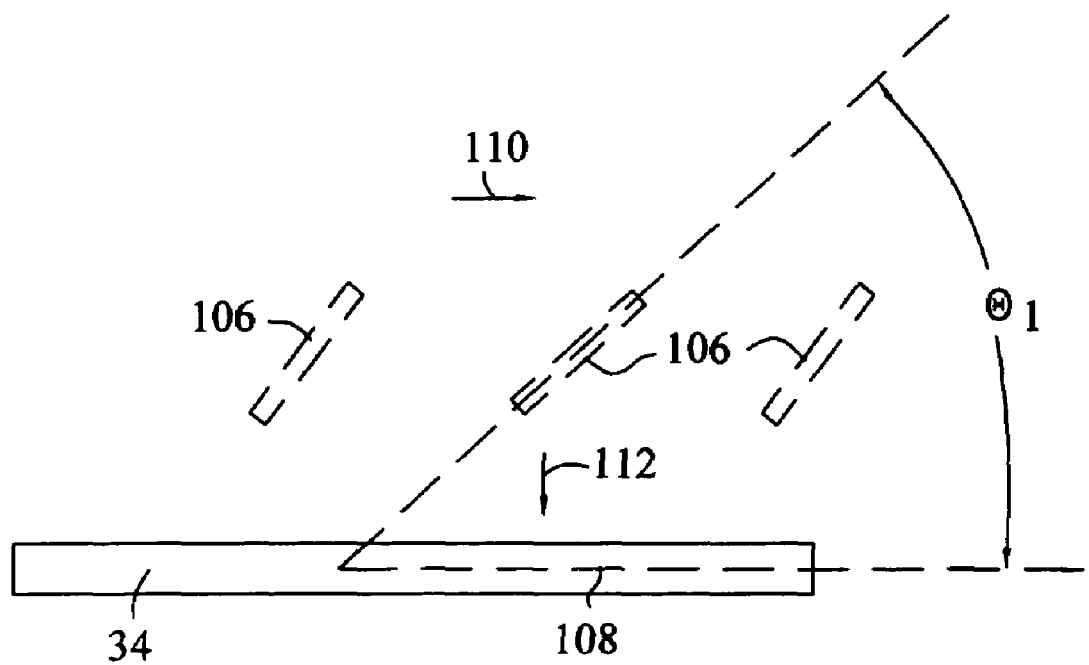
FIG. 7 is a schematic side view illustrating the angular relationship between one embodiment of a propeller of an air-moving device of a compact disc cooling apparatus of the present invention and a plane defined by the compact disc.
Figure 8:
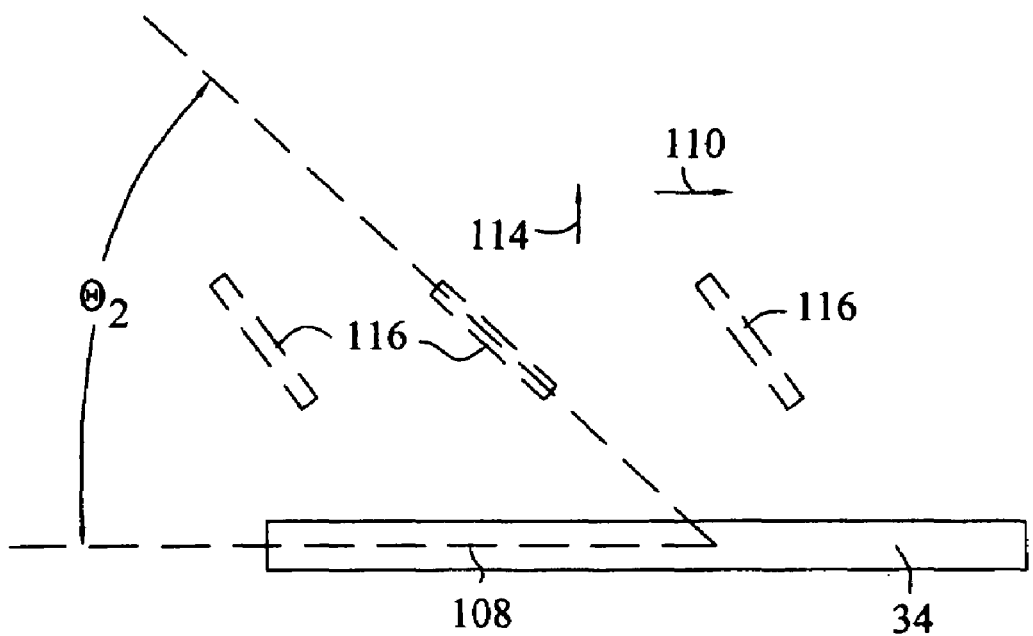
FIG. 8 is a schematic side view illustrating the angular relationship between another embodiment of a propeller of an air-moving device of a compact disc cooling apparatus of the present invention and a plane defined by the compact disc.

FIGS. 7 and 8 illustrate how the pitch of the propeller blades in conjunction with the direction of rotation of the fan determines whether the fan will blow air toward compact disc 34 or draw air away from compact disc 34. More particularly, each of propeller blades 106 in FIG. 7 has a pitch angle $\theta_1$ of approximately 40° relative to a plane 108 defined by compact disk 34. It should be noted that only the outermost tips of blades 106, 116 are presented in FIGS. 7 and 8, and that only the middle one of the three blades 106, 116 in each figure is presented in a "straight-on" view. Thus, although the outside ones of the three blades 106 appear to have pitches steeper than 40°, this is only due to the viewing angle, and the pitches of the outside blades 106 are approximately 40° as well. As blades 106 are rotated in direction 110, it would be clear to those of skill in the art that blades 106 move air in direction 112 toward compact disc 34.

Each of propeller blades 116 in FIG. 8 has a pitch angle $\theta_2$ of approximately 40° relative to a plane 108 defined by compact disk 34. However, the direction of the pitch of blades 116 is opposite to the direction of the pitch of blades 106. Thus, as blades 116 are rotated in direction 110, it would be clear to those of skill in the art that blades 116 move air in direction 114 away from compact disc 34. Regardless of whether air is moved in direction 112 or direction 114, the moving air adjacent compact disk 34 carries heat away from disk 34 by convection.

Figure 9:
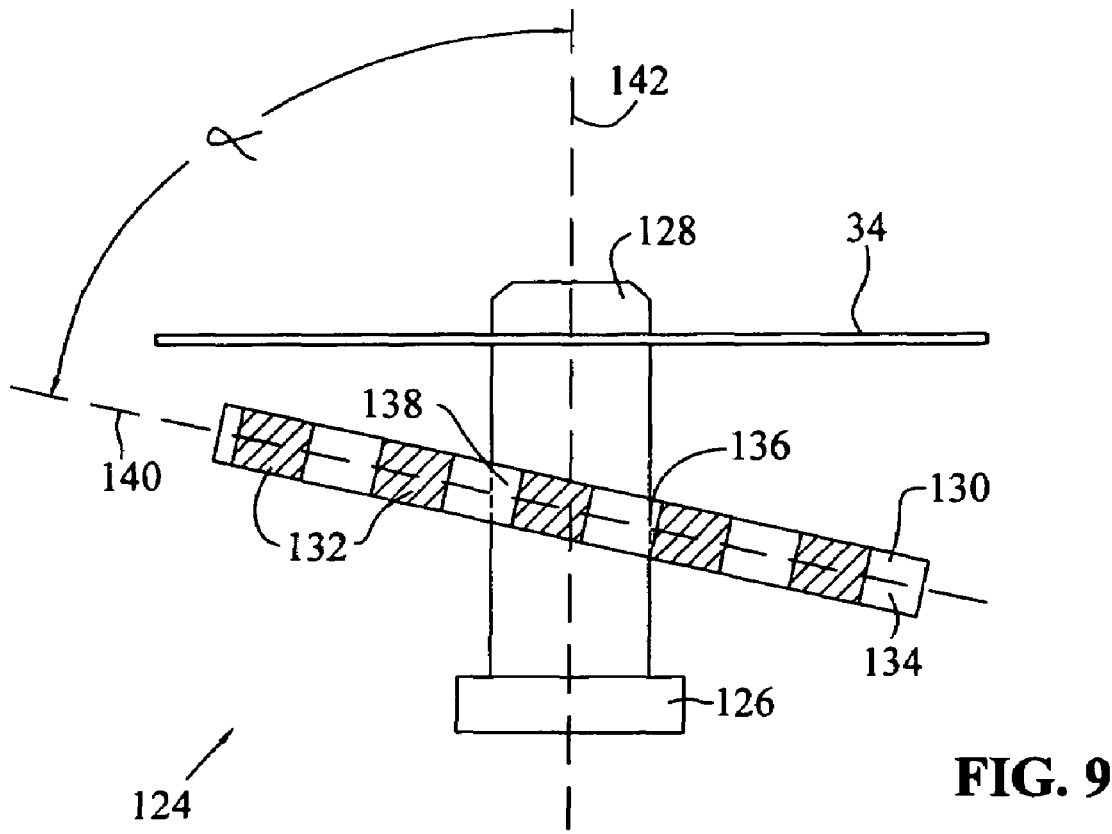
FIG. 9 is a schematic side view illustrating the angular relationship between a plane defined by a further embodiment of an air-moving device of a compact disc cooling apparatus of the present invention and an axis of rotation of a hub of the compact disc player.

Another embodiment of a compact disc cooling apparatus 124 of the present invention is shown in FIG. 9. Cooling apparatus 124 includes an actuator in the form of a motor 126 coupled to a hub 128. An air-moving device in the form of a fan 130 is also coupled to or otherwise attached to hub 128.

In contrast to the previous embodiments, fan 130 is neither parallel to compact disc 34 nor perpendicular to hub 128. Fan 130 can be a closed ring type of fan including propellers 132 interconnecting an outer closed ring 134 and an inner closed ring 136 that defines an elliptical throughhole 138.

Propellers 132 define a plane 140 that is nonperpendicular to a rotational axis 142 of hub 128. More particularly, a camber angle between plane 140 and axis 142 is approximately between 60° and 89°.

In operation, both fan 130 and compact disc 34 rotate along with hub 128 by virtue of being attached thereto by a friction fit. The rotation of fan 130 causes propellers 132 to blow air in directions that are dependent upon the design of propellers 132. Propellers 132 can be provided with a variety of designs depending upon the requirements of a particular application. Other aspects of compact disc cooling apparatus 124 are substantially similar to those of compact disc cooling apparatus 14, and thus are not discussed in detail herein.

The embodiments disclosed above are not intended to be exhaustive or to limit the invention to the precise forms disclosed in the detailed description. Rather, the embodiments have been chosen and described so that others skilled in the art may utilize their teachings.

Although described in the exemplary embodiments, it will be understood that various modifications may be made to the subject matter without departing from the intended and proper scope of the invention. For example, although only closed ring fans have been illustrated herein, it is to be understood that other types of fans, such as open ring fans and squirrel cage fans are within the scope of the present invention. Moreover, the blade count (number of propellers provided in a fan), pitch angle and camber angle may all be modified based upon the expected rotational velocity of the motor and the desired amount of air flow. Further, it is possible to add vents to the housing of the compact disc player in order to allow heated air to flow out of the interior of the housing.

The invention claimed is:

1. A method for processing a compact disc, comprising:
   placing the compact disc on a rotatable hub such that a throughhole of the compact disc receives said hub;
   engaging the compact disc with a fan device such that the compact disc is biased farther onto said hub;
   attaching said fan device to said hub; and
   rotating said hub such that the compact disc and said fan device also rotate, and said fan device moves air about the compact disc to thereby carry heat away from the compact disc.

2. The method of claim 1, wherein said attaching step includes placing the fan device on the hub such that a throughhole of said fan device receives said hub with a friction fit.

3. The method of claim 1, wherein said rotating step includes blowing air toward the compact disc.

4. The method of claim 1, wherein said rotating step includes drawing air away from the compact disc.

5. The method of claim 1, wherein said engaging step includes using a compression arm to push said fan device into engagement with the compact disc.

6. The method of claim 5, wherein said compression arm is integrally formed with said fan device.

7. The method of claim 1, wherein said attaching step includes using a compression arm to push said fan device onto said hub with a friction fit.

8. The method of claim 7, wherein said compression arm is integrally formed with said fan device.

9. A device for at least one of reading and writing to a compact disc, comprising:
   a hub configured to retain the compact disc;
   a plurality of propellers attached to said hub; and
   an actuator coupled to said hub and configured to rotate said hub such that said at least one propeller moves air about the compact disc;
   wherein said plurality of propellers each include a top surface and a bottom surface, said bottom surfaces facing said actuator, and topmost points on each of said top surfaces of said plurality of propellers defining a plane, said hub having an axis of rotation, said plane being non-perpendicular to the axis of rotation.

10. The device of claim 9, wherein an angle between said plane and said axis of rotation is approximately between 60° and 89°.

11. The device of claim 10, wherein said plurality of propellers are configured to move air adjacent a read/write side of the compact disc.

12. The device of claim 9, further comprising a read/write head, wherein a radially outermost tip of said plurality of propellers is closer to said hub in a radial direction than is said read/write head.

* * * * *